United States Patent
Terwilliger et al.

(10) Patent No.: US 12,031,485 B1
(45) Date of Patent: Jul. 9, 2024

(54) WATER STORAGE PRECOOLING AND WATER CYCLE CHILLER

(71) Applicant: Raytheon Technologies Corporation, Farmington, CT (US)

(72) Inventors: Neil J. Terwilliger, Cheshire, CT (US); Andressa L. Johnson, Kailua, HI (US); Joseph E. Turney, Amston, CT (US); Christopher J. Hanlon, Sturbridge, MA (US); Justin R. Urban, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/304,524

(22) Filed: Apr. 21, 2023

(51) Int. Cl.
*F02C 7/18* (2006.01)

(52) U.S. Cl.
CPC ........ *F02C 7/185* (2013.01); *F05D 2220/323* (2013.01); *F05D 2260/2322* (2013.01)

(58) Field of Classification Search
CPC ....................................................... F02C 7/185
See application file for complete search history.

(56) References Cited

U.S. PATENT DOCUMENTS

| | | | | |
|---|---|---|---|---|
| 2,447,696 | A | * | 8/1948 | Forsyth ..................... F02C 3/30 60/264 |
| 4,509,324 | A | * | 4/1985 | Urbach ................... F02C 6/203 60/39.55 |
| 11,635,022 | B1 | * | 4/2023 | Terwilliger ............... F02C 9/00 60/775 |
| 11,920,515 | B2 | * | 3/2024 | Alahyari ................. F02C 7/141 |
| 11,920,526 | B1 | * | 3/2024 | Terwilliger ............. F02C 7/224 |
| 11,933,217 | B2 | * | 3/2024 | Rocco ........................ F02C 3/30 |
| 2021/0207500 | A1 | * | 7/2021 | Klingels .................. F01K 23/10 |
| 2023/0035231 | A1 | | 2/2023 | Hu |
| 2023/0374911 | A1 | * | 11/2023 | Terwilliger ............... F02C 3/22 |
| 2024/0026816 | A1 | * | 1/2024 | Terwilliger ............... F02C 3/30 |

FOREIGN PATENT DOCUMENTS

| WO | 2022028653 A1 | 2/2022 |
|---|---|---|
| WO | WO-2022232828 A1 * | 11/2022 |

* cited by examiner

*Primary Examiner* — David P. Olynick
(74) *Attorney, Agent, or Firm* — Carlson, Gaskey & Olds, P.C.

(57) ABSTRACT

An aircraft propulsion system includes a core engine for generating an exhaust gas flow that is used to generate a power output. A condenser assembly extracts water from the gas flow and stores water in a water storage tank. A cooling system maintains water stored in the storage tank at a temperature within a predefined range.

20 Claims, 3 Drawing Sheets

WATER STORAGE PRECOOLING AND WATER CYCLE CHILLER

TECHNICAL FIELD

The present disclosure relates generally to an aircraft propulsion system that includes a steam generation system transforming recovered water into a steam flow injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Water recovered from the high energy exhaust may be transformed into steam and injected into the core flow to improve engine efficiency. Recovery of water from the exhaust flow at certain operating conditions may be less than desired and present challenges to engine operation.

SUMMARY

A turbine engine assembly according to a disclosed example embodiment includes, among other possible things, a compressor section where a core airflow is compressed, a combustor section where the compressed core airflow from the compressor section is mixed with fuel and ignited to generate an exhaust gas flow, a turbine section including at least two turbine stages through which the exhaust gas flow expands to generate a mechanical power output, a condenser assembly where water is extracted from the exhaust gas flow exhausted from the turbine section, a water storage tank where extracted water from the condenser assembly is stored, a cooling system associated with the water storage tank for maintaining water stored in the storage tank at a temperature within a predefined range, and an evaporator system configured for generating a steam flow from at least a portion of water extracted by the condenser for injection into the core airflow.

In further embodiment of the foregoing turbine engine assembly, the cooling system includes a chiller in thermal communication with a cooling flow for cooling at least a portion of water from the water storage tank.

In a further embodiment of any of the foregoing turbine engine assemblies, the cooling flow comprises a fuel flow in thermal communication with the cooling system.

In a further embodiment of any of the foregoing turbine engine assemblies, the cooling flow comprise a ram air flow in thermal communication with the cooling system.

In a further embodiment of any of the foregoing turbine engine assemblies, a controller is configured for operating the cooling system to generate a water temperature within the predefined range.

In a further embodiment of any of the foregoing turbine engine assemblies, a sensor assembly provides information to the controller that is indicative of the water temperature to the controller.

In a further embodiment of any of the foregoing turbine engine assemblies, the sensor assembly is configured to communicate information to the controller that is indicative of at least one of a pressure of the water and a temperature of the water.

In a further embodiment of any of the foregoing turbine engine assemblies, a flow sensor is configured to communicate information to the controller that is indicative of a flow rate of water into and out of the water storage tank.

In a further embodiment of any of the foregoing turbine engine assemblies, including a valve system for controlling a flow of water between the cooling system and the water storage tank.

In a further embodiment of any of the foregoing turbine engine assemblies, the cooling system is in flow series with the condenser such that a chiller is downstream of a cooling air flow from the condenser.

In a further embodiment of any of the foregoing turbine engine assemblies, the condenser assembly includes a water separator and a portion of the cooling system within a common unit.

A method of operating a turbine engine according to another disclosed example embodiment includes, among other possible things, generating a gas flow by igniting a mixture of a core flow and fuel within a combustor section, generating a power output by expanding the gas flow through a first turbine section, extracting water from the gas flow in a condenser assembly, storing the extracted water within a water storage tank, controlling a temperature of water within the storage tank within a predefined range that is less than an ambient temperature, generating a steam flow by heating the extracted water in an evaporator, and injecting the steam flow into the core flow.

A further embodiment of the forgoing method includes cooling the water with a cooling flow in thermal communication with water from the water storage tank.

A further embodiment of any of the forgoing methods includes sensing a temperature of the water and controlling one of a flow of water or the cooling flow based on the sensed temperature to control the temperature of water.

A further embodiment of any of the forgoing methods includes controlling at least one of the cooling flow and a water flow to maintain the temperature of the water within the predefined range.

A further embodiment of any of the forgoing methods, controlling the water flow comprises controlling an extraction rate of water from the gas flow.

A further embodiment of any of the forgoing methods, water stored in the tank is more than 30° F. (16° C.) colder than water extracted by the condenser during a takeoff operation condition.

An aircraft propulsion system according to another disclosed example embodiment includes, among other possible things a core engine where a compressed core airflow is mixed with fuel and ignited to generate an exhaust gas flow that is used to generate a power output, a condenser assembly where water is extracted from the gas flow, a water storage tank where extracted water from the condenser assembly is stored, a cooling system associated with the water storage tank for maintaining water stored in the storage tank at a temperature within a predefined range, an evaporator system configured for generating a steam flow from at least a portion of water extracted by the condenser for injection into the core airflow, and a controller configured for operating the cooling system to maintain a water temperature within the predefined range.

In another example embodiment of the foregoing aircraft propulsion system, the cooling system includes a chiller in thermal communication with a cooling flow for cooling at least a portion of water from the water storage tank.

In another example embodiment of the foregoing aircraft propulsion system, a valve system is provided for controlling a flow of water between the cooling system and the water storage tank and the controller is further configured to operate the valve system to control the flow of water to maintain the water temperature within the predefined range.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
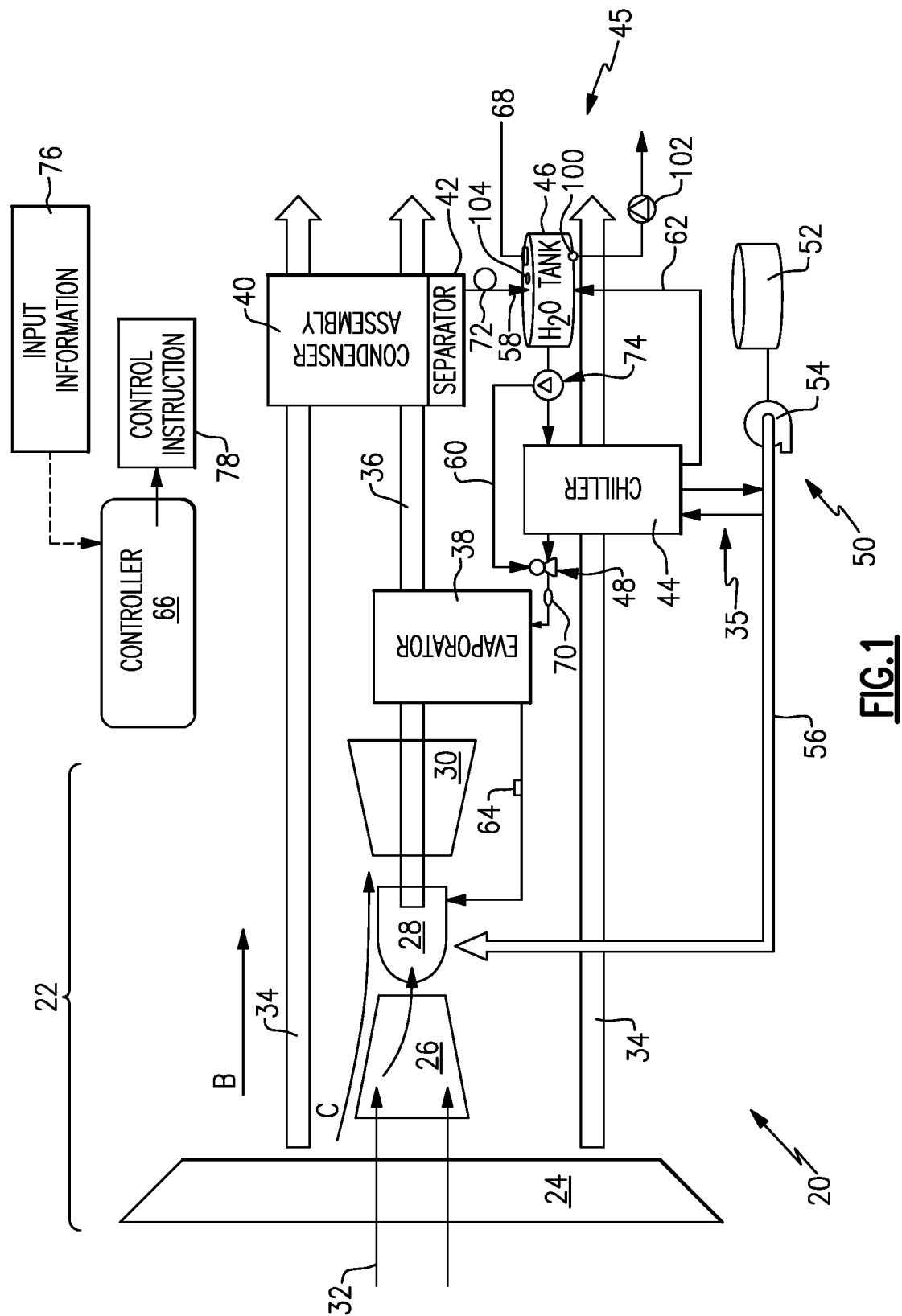
FIG. 1 is a schematic view of an example aircraft propulsion system embodiment.

FIG. 1 schematically illustrates an example propulsion system 20 including a core engine 22 that generates an exhaust gas flow 36. An evaporator 38 generates a steam flow 64 using water extracted from the gas flow 36 by a condenser assembly 40. A cooling system 45 is associated with the condenser 40 to maintain the temperature of extracted and stored water at a temperature within a predefined range. During some engine operating conditions, temperatures may not enable sufficient cooling to condense desired amounts of water from the gas flow 36. The cooling system 45 provides for cooling of stored water to reduced temperatures that improve water extraction from the gas flow 36.

The core engine 22 includes a fan 24, a compressor section 26, a combustor section 28 and the turbine section 30. The fan 22 drives a bypass airflow 34 along a bypass flow path B, A core airflow 32 is drawn into the compressor section 26 and along a core flow path C where it is compressed and communicated to the combustor section 28. In the combustor section 28, compressed core airflow 32 is mixed with a fuel flow 56 and ignited to generate the high energy combusted exhaust gas flow 36 that expands through the turbine section 30 where energy is extracted and utilized to drive the fan 24 and the compressor section 26.

A fuel system 50 includes a fuel tank 52 and a pump 54 for generating the fuel flow 56 to the combustor section 28. The example fuel system 50 is configured to provide a hydrogen based fuel such as a liquid hydrogen (LH$_2$) and may include heat exchangers for boiling the fuel flow. Although hydrogen is disclosed by way of example, other non-carbon based fuels could be utilized and are within the contemplation of this disclosure. Moreover, the disclosed features may also be beneficial in an engine configured to operate with traditional carbon based aviation fuels and/or biofuels, such as sustainable aviation fuels and the like.

The example disclosed evaporator 38 receives a flow of water from a pump 48 that pressurizes water held within a water storage tank 46. The gas flow 38 heats the water in the evaporator 38 to generate the steam flow 64 that is injected into the core airflow 32. In the disclosed example, the steam flow 64 is injected into the combustor 28. However, the steam flow 64 may be injected in other locations and remain within the scope and contemplation of this disclosure.

The steam flow 64 increases mass flow through the turbine section 30 and thereby increases engine power and efficiency. The increased power output from the injected steam 64 is due to increased mass flow through the turbine section 30 without a corresponding increase in work from the compressor section 26.

The amount of water extracted within the condenser 40 is affected by a temperature differential between a cooling flow and the gas flow 36. In one disclosed example, bypass airflow 34 provides the cooling flow through the condenser 40. In some engine operating conditions, such as for example, take-off conditions, the temperature of the cooling flow may not provide a sufficient temperature differential to condense and extract a desired volume of water. Additionally, water extracted during takeoff operating conditions may be much warmer than water extracted at during cruise conditions. For example, water extracted by the condenser 40 during takeoff operating conditions may be around 150° F. (65° C.), while water extracted during cruise conditions may be around 90° F. (32° C.).

Water extracted during different operational periods will be at different temperatures. Water in the tank 46 extracted during cruise conditions may be at a much different temperature than the water extracted by the condenser at takeoff operating conditions. For example, the water stored in the tank 46 that was extracted during cruise operation conditions may be below 100° F. (37° C.) even while the water being extracted during takeoff operating conditions by the condenser assembly is 150° F. (65° C.). As a further example, depending on when water was extracted, water within the tank 56 and supplied to the evaporator 38 during takeoff operating conditions may be more than 30° F. (16° C.) colder than water being extracted by the condenser 40. Accordingly, stored water may be needed to accommodate different operating conditions and tailored to the various possible temperature differences between stored and extracted water.

The example cooling system 45 provides for cooling of stored water that provides for a cooler temperature within the condenser assembly 40. The cooler temperatures within the condenser assembly 40 enable increased amounts of water extraction to accommodate less than optimal engine operating conditions. The cooling system 45 includes a chiller 44 that is in thermal communication with a cooling flow. In one disclosed example, the cooling flow is the bypass airflow 34. However, the cooling flow could be other coolants such as fuel or a refrigerant and remain within the scope and contemplation of this disclosure.

Water flow between the chiller 44 and the water tank 46 is controlled by a valve 74. Water may flow directly from the water tank 46 to the chiller 44, or may be routed through a bypass passage 60 to the pump 48. A mix of water from the chiller 44 and the bypass passage 60 may be utilized to control a temperature of water provided to the evaporator 38. Although a single valve 74 is disclosed by way of example, additional valves or a system of conduits and valves could be utilized to control water flow and is within the contemplation and scope of this disclosure.

Moreover, the water tank 46 includes a water level sensor 104 that provides information indicative of a volume of water in the water tank 46. The water tank 46 further includes a drain 100 and a valve 102 that can be opened to enable water to be dumped if the volume of water in the tank exceeds a predefined capacity.

A controller 66 receives input information 76 that is utilized to generate control instructions 78 to maintain the water temperature within a predefined range. In one disclosed example, the input information 76 is provided by a first temperature sensor 68 within the storage tank 46 and a second temperature sensor 70 near an outlet of the pump 48. A flow sensor 72 may, in some embodiments, provide information indicative of water flow extracted by the condenser assembly 40. The example flow sensor 72 is configured to communicate information to the controller 66 that is indicative of a flow rate of water into and out of the water storage tank 46. The water level sensor 104 provides information on the amount of water in the water tank 46. Other sensor systems and devices of the engine 20 may also be utilized to provide information indicative of water temperature and demand. The control instructions 78 may be used to control the valve 74 to bypass some portion of water flow through the bypass passage 60. Moreover, the valve 102 may be used to assure that the volume of water does not exceed a predefined capacity. Although the valves 74 and 102 are shown by way of example, other control devices may be utilized to adjust an amount and cooling of water within the storage tank 46.

The example controller 66 relates to a device and system for performing necessary computing or calculation operations of the cooling system 45. The controller 66 may be specially constructed for operation of the cooling system 45, or it nay comprise at least a general-purpose computer selectively activated or reconfigured by software instructions. The controller 66 may further be part of full authority digital engine control (FADEC) or an electronic engine controller (EEC).

The controller 66 may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions may include one or more separate programs, each of which includes an ordered listing of executable instructions for implementing logical functions. The example controller 66 includes all devices that operate to communicate and to generate control instructions 78 utilizing to maintain a desired temperature of water within the water storage tank 46.

Figure 2:
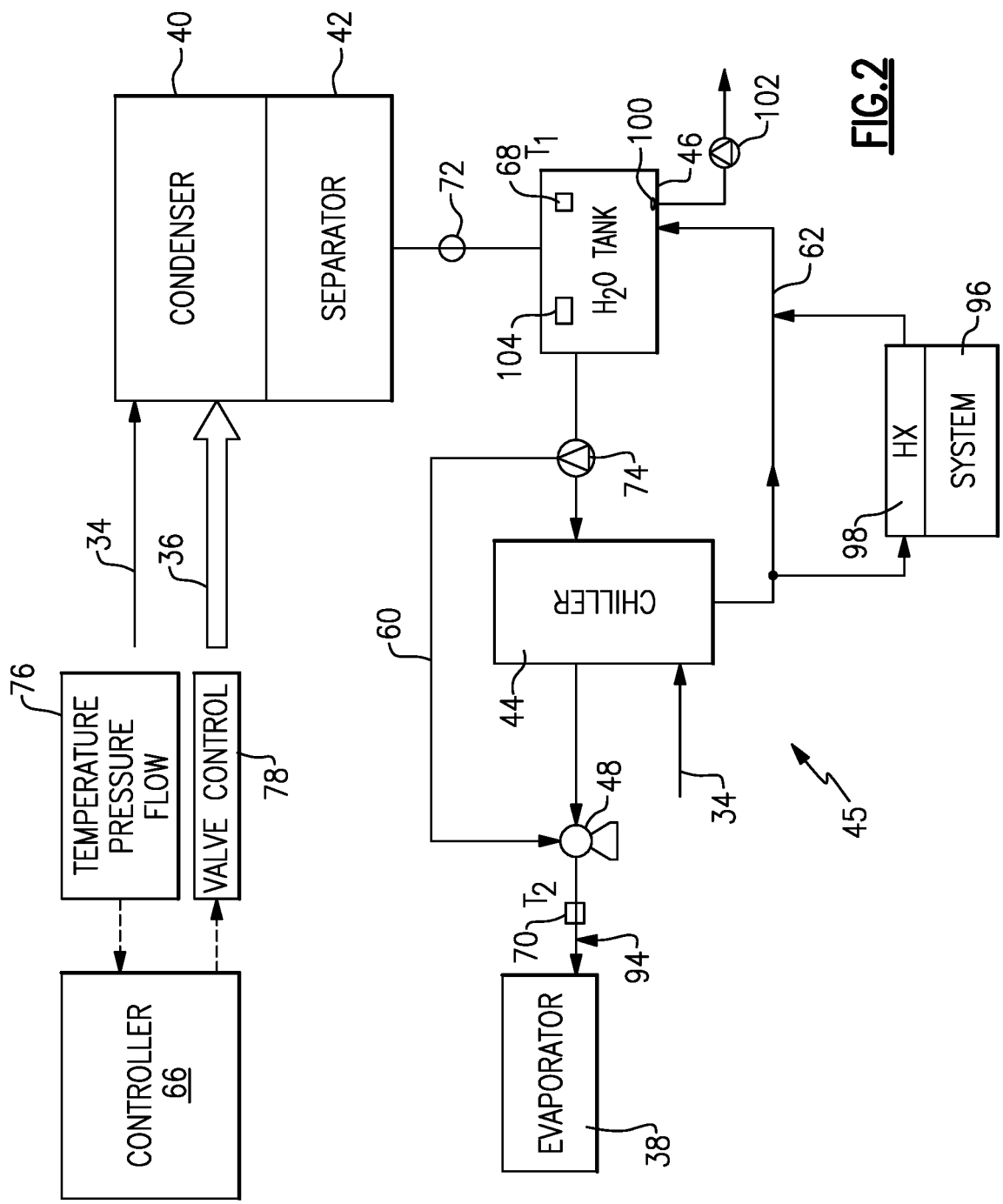
FIG. 2 is a schematic view of an example cooling system embodiment.

Referring to FIG. 2 with continued reference to FIG. 1, the example cooling system 45 is shown in an enlarged schematic view. In one example embodiment, a temperature (T1) of water within the storage tank 46 is communicated by the temperature sensor 68 to the controller 66. A temperature (T2) of water supplied to the evaporator 38 is communicated by the temperature sensor 70 to the controller 66. A flow rate from the flow sensor 72 is also communicated to the controller 66.

The predefined temperature range for water within the storage tank 46 will vary depending on engine operating conditions, ambient conditions and any other factors that affect extraction of water from the gas flow 36. Moreover, the volume of water within the water storage tank 46 is measured by water level sensor 104 and may also be utilized as a basis for control of water temperature by dumping warmer water within the tank 46 to provide space for cooler water.

The gas flow 36 is cooled in the condenser 40 by the bypass airflow 34 to condense water. The condensed water is separated from the gas flow 36 by a water separator 42 associated with the condenser 40. The extracted water is communicated to the storage tank 46. Water from the storage tank 46 is communicated to the evaporator 38 to generate the steam flow 64.

Water from the storage tank 46 may be routed to the evaporator 38 through the chiller 44 or through a bypass passage 60 or a mixture of both. In this disclosed embodiment, the chiller 44 is arranged in parallel with the condenser 40 such that both receive the cooling bypass airflow 34 separately. The example cooling system 45 is shown schematically as separate components. However, the example system 45 may be configured including other devise and locations. Moreover, the example devices of the cooling system 45 may be integrated into a single housing and remain within the contemplation and scope of this disclosure.

A portion of water communicated to the chiller 44 is sent back to the storage tank 46 as a cooled water flow 62. A valve 74 is provided between the storage tank 46 and the chiller 44. The temperature within the water storage tank 46 may be controlled by controlling the flow rate and volume of water circulated back to the water storage tank 46.

In one example embodiment, the controller 66 actuates the valve 74 to control water flow between the chiller 44 and the storage tank 46 based on the temperature T1, provided by the first temperature sensor 68. If the temperature within the storage tank 46 is outside of the predefined temperature range, the flow to and from the chiller 44 is adjusted until the temperature is within the predefined range. Adjustment of the temperature may include draining water through the drain 100 by control of the valve 102.

Cooled water from the chiller 44 may be communicated to a heat exchanger 98 to cool another system 96. The system 96 may be an engine or aircraft system. The engine systems may include intercooling, and cooled cooling air systems along with any cooling systems associated with operation of the engine 20.

In one disclosed example operational embodiment, the controller 66 receives information indicative of water temperature from temperature sensors 68 and 70 and information indicative of a volume of water from water level sensor 104. The controller 66 also receives information indicative of engine operating conditions and determines if the communicated temperature is within a predefined temperature range associated with a current engine operating condition (e.g., take-off, cruise, climb, descent, etc.). The predefined temperature range may be determined based on various engine operating parameters and conditions (e.g., engine temperature (e.g., turbine temperature, exhaust temperature, etc.), throttle or power lever position, fuel flow, etc.). Information may include demand during the current operating condition or may be preset parameters based on current conditions.

If the temperatures are within the predefined ranges, operation continues to extract water and communicate that water to the evaporator 38 without change. If the temperatures fall outside of the predefined conditions, the controller 66 may actuate the valve 74 to control the flow of water to the chiller 44. If the temperature of water at the storage tank 46 is greater than desired, the controller 66 may actuate the valve 74 to increase water flow sent through the chiller 44 and decrease water flow through the bypass passage 60. Cooled water flow 62 is sent back to the tank 46 until the temperatures are within the predefined temperature range.

If the temperature of water within the tank 46 is within the predefined temperature range, the controller 66 actuates the valve 74 to permit water to flow to the chiller as necessary to maintain the temperature within the predefined range. If the temperature of water within the tank 46 is below the predefined temperature range, the controller 66 may actuate the valve 74 to reduce the amount of water flowing through the chiller 74. The reduced flow of water through the chiller 44 will reduce the amount of chilled water circulates back to the tank 46 to increase water temperature.

In one disclosed example, water provided by the condenser 40 is below about 150° F. (65° C.), water provided through the chiller 44 is below about 90° F. (32° C.), and water within the tank 46 is regulated to be between just above freezing and about 90° F. (32° C.).

Although the flow of water through the valve 74 is disclosed by way of example as providing control of water temperature, other control devices could be utilized to adjust flows to provide for adjustment of the water temperature.

Moreover, the controller 66 may provide control for a volume of water stored in the tank 46. In operating conditions that are favorable for water extraction, increased volumes of water may be recovered and stored in the tank 46. The increased volume of water within the tank may be maintained in anticipation of future operating conditions where water extraction is not as efficient. For example, water obtained during cruise operating conditions is cooler than water extracted during takeoff conditions. The tank 46 therefore could be filled with cooler water during cruise conditions in anticipation of the next takeoff. Accordingly, the example controller 66 may increase the volume of water recovered and stored in the storage tank 46 in anticipation of operations at warmer conditions.

Water stored in the tank 46 is disclosed as being extracted from the gas flow 36. However, the tank 46 may be filled during aircraft downtime prior to engine operation. The water provided by a ground based water system could be chilled to accommodate initial engine operation until water extraction is capable of meeting operational demands.

Figure 3:
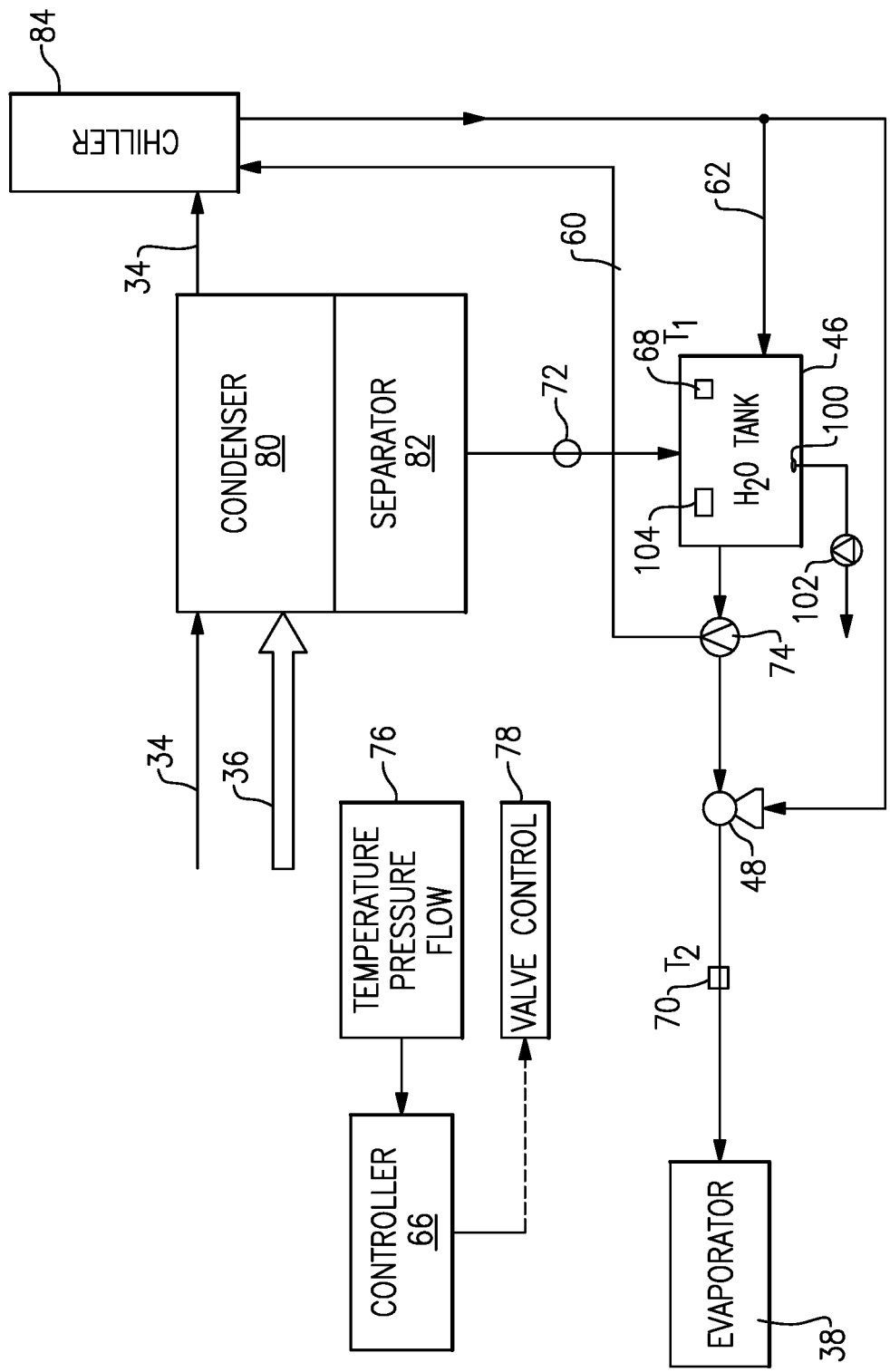
FIG. 3 is a schematic view of another cooling system embodiment.

Referring to FIG. 3, another example cooling system is schematically shown and indicated at 55. The cooling system 55 includes a chiller 84 disposed in series with the condenser 40. The chiller 84 is located such that it receives the cooling bypass airflow 34 downstream from condenser 80 and water separator 82. The chiller 84 communicates a chilled water flow either to the evaporator 38 by way of the pump 48 or back to the water storage tank 46. The controller 66 uses information indicative of water condition 76 to generate instructions for operation of the valve 74. The example valve 74 is configured to proportion flow between the chiller 84 and the bypass passage 60 to maintain the water temperature within the water storage tank 46 within a predefined range. The controller 66 ma also control the level of water within the tank 46 by draining water through the drain 100 by operation of the valve 102.

Although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The example engine embodiments enable increased water extraction by maintaining stored water temperatures within predefined ranges determined to generate desired amounts of water flow for engine operating conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section where a core airflow is compressed;
a combustor section where the compressed core airflow from the compressor section is mixed with fuel and ignited to generate an exhaust gas flow;
a turbine section including at least two turbine stages through which the exhaust gas flow expands to generate a mechanical power output;
a condenser assembly where water is extracted from the exhaust gas flow exhausted from the turbine section;
a water storage tank where extracted water from the condenser assembly is stored;
a cooling system associated with the water storage tank for maintaining water stored in the storage tank at a temperature within a predefined range;
a controller configured for operating the cooling system to maintain a water temperature within the predefined range; and
an evaporator system configured for generating a steam flow from at least a portion of water extracted by the condenser for injection into the core airflow.

2. The turbine engine as recited in claim 1, wherein the cooling system includes a chiller in thermal communication with a cooling flow for cooling at least a portion of water from the water storage tank.

3. The turbine engine as recited in claim 2, wherein the cooling flow comprises a fuel flow in thermal communication with the cooling system.

4. The turbine engine as recited in claim 2, wherein the cooling flow comprise a ram air flow in thermal communication with the cooling system.

5. The turbine engine as recited in claim 2, including a controller configured for operating the cooling system to generate a water temperature within the predefined range.

6. The turbine engine as recited in claim 5, including a sensor assembly providing information to the controller that is indicative of the water temperature to the controller.

7. The turbine engine as recited in claim 6, wherein the sensor assembly is configured to communicate information to the controller that is indicative of at least one of a pressure of the water and a temperature of the water.

8. The turbine engine as recited in claim 5, including a flow sensor configured to communicate information to the controller that is indicative of a flow rate of water into and out of the water storage tank.

9. The turbine engine as recited in claim 5, including a valve system for controlling a flow of water between the cooling system and the water storage tank.

10. The turbine engine as recited in claim 1, wherein the cooling system is in flow series with the condenser such that a chiller is downstream of a cooling air flow from the condenser.

11. The turbine engine as recited in claim 1, wherein the condenser assembly includes a water separator and a portion of the cooling system within a common unit.

12. A method of operating a turbine engine comprising:
generating a gas flow by igniting a mixture of a core flow and fuel within a combustor section;
generating a power output by expanding the gas flow through a first turbine section; extracting water from the gas flow in a condenser assembly;
storing the extracted water within a water storage tank;
controlling, using a controller and a cooling system, a temperature of water within the storage tank to remain within a predefined range;

generating a steam flow by heating the extracted water in an evaporator; and injecting the steam flow into the core flow.

13. The method as recited in claim 12, including cooling the water with a cooling flow in thermal communication with water from the water storage tank.

14. The method as recited in claim 13, including sensing a temperature of the water and controlling one of a flow of water or the cooling flow based on the sensed temperature to control the temperature of water.

15. The method as recited in claim 14, including controlling at least one of the cooling flow and a water flow to maintain the temperature of the water within the predefined range.

16. The method as recited in claim 15, wherein controlling the water flow comprises controlling an extraction rate of water from the gas flow.

17. The method as recited in claim 12, wherein water stored in the tank is more than 30° F. (16° C.) colder than water extracted by the condenser during a takeoff operation condition.

18. An aircraft propulsion system comprising:
a core engine where a compressed core airflow is mixed with fuel and ignited to generate an exhaust gas flow that is used to generate a power output;
a condenser assembly where water is extracted from the gas flow;
a water storage tank where extracted water from the condenser assembly is stored;
a cooling system associated with the water storage tank for maintaining water stored in the storage tank at a temperature within a predefined range;
an evaporator system configured for generating a steam flow from at least a portion of water extracted by the condenser for injection into the core airflow; and
a controller configured for operating the cooling system to maintain a water temperature within the predefined range.

19. The aircraft propulsion system as recited in claim 18, wherein the cooling system includes a chiller in thermal communication with a cooling flow for cooling at least a portion of water from the water storage tank.

20. The aircraft propulsion system as recited in claim 19, including a valve system for controlling a flow of water between the cooling system and the water storage tank and the controller is further configured to operate the valve system to control the flow of water to maintain the water temperature within the predefined range.

* * * * *